March 7, 1967  J. H. HAHN  3,308,322
PRINTED DISC ELECTRICAL MACHINERY
Filed April 11, 1963  2 Sheets-Sheet 1
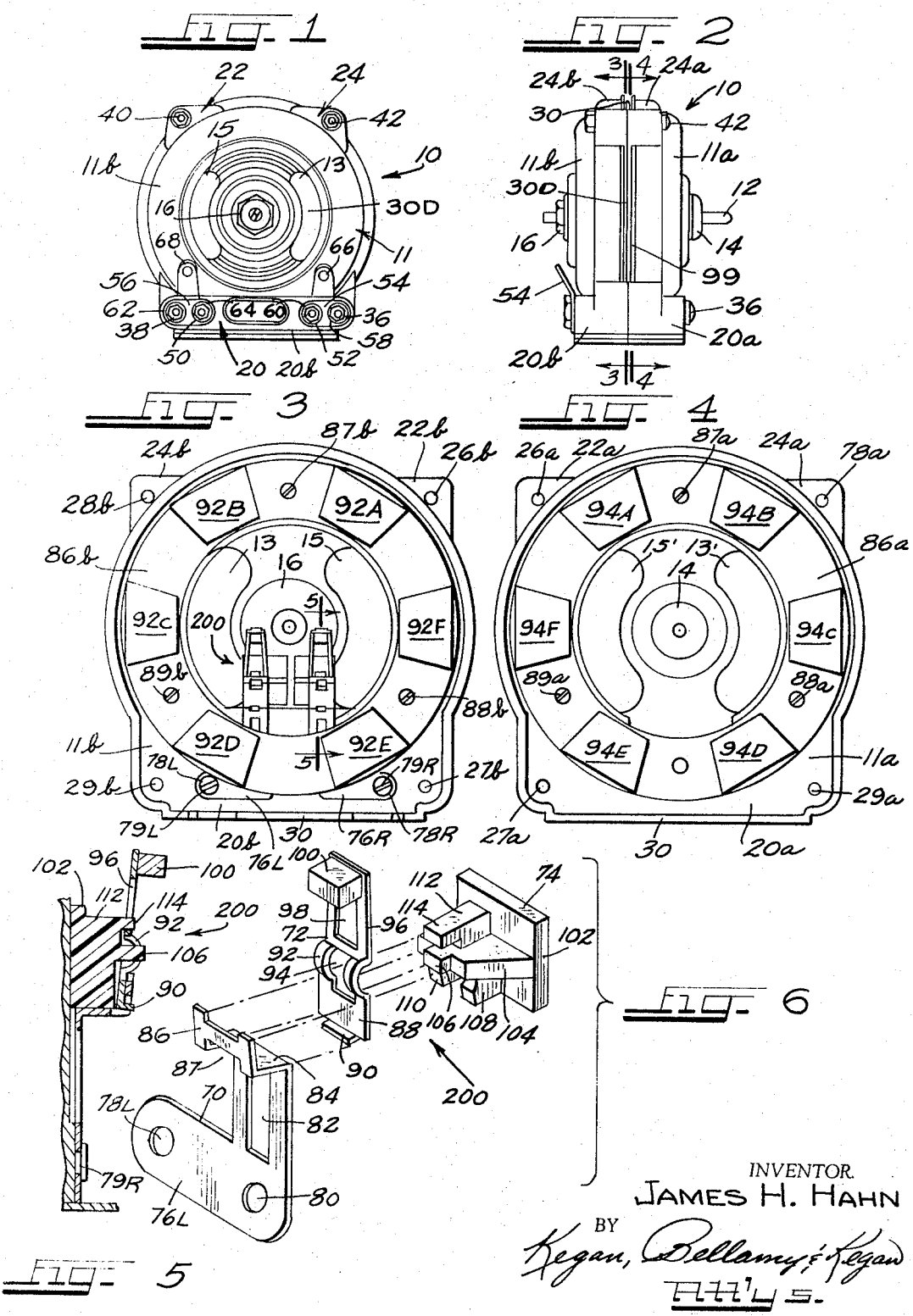
INVENTOR.
JAMES H. HAHN

INVENTOR
JAMES H. HAHN

United States Patent Office 3,308,322
Patented Mar. 7, 1967

3,308,322
PRINTED DISC ELECTRICAL MACHINERY
James H. Hahn, Glenview, Ill., assignor to Basic Motor Developments, Inc., Tallahassee, Fla., a corporation of Florida
Filed Apr. 11, 1963, Ser. No. 272,463
16 Claims. (Cl. 310—268)

This invention (which is a continuation-in-part of a co-pending application entitled, Printed Disc Electrical Machinery, filed March 8, 1962, Ser. No. 179,515, now Patent No. 3,096,455), relates to rotating electrical machinery and more specifically to such machinery which utilizes a disc-type rotor having a single disc conductive pattern of the printed, plated, etched, or pressure-bonded type.

In accordance with the invention, a novel pattern is provided on a single disc rotor to provide operating characteristics heretofore unachievable. In the described embodiment, the novel pattern for such a disc comprises a conductive winding located on the disc between the center and the circumference thereof in order to achieve the maximum utilization of the surface of the disc and so as to define an odd number of magnetic pole centers in the form of nine similar spiral windings, each substantially occupying 40° of the disc surface and each spiral being connected in series with the third spiral adjacent thereto by connecting the innermost extreme of a given spiral to the outermost extreme of the third adjacent spiral. This set of three series units of three spirals each is in turn integrated with a nine segment commutator (each segment occupying substantially 40° of the surface of the disc) by connecting a first series of three spirals across a first and a second commutator segments, by connecting a second series of three spirals across the second and a third commutator segments; and by connecting a third series of three spirals across the first and the third commutator segments.

In this manner, a motor operation is achieved based upon the angular orientation of the armature poles of the rotor to the fixed field poles of the stator; or, stated in equivalent terms, a motor operation is achieved based upon a sequential short-out of a given series of three spirals when the three spirals are aligned with three of the six magnets in the stator field. When a first given series is shorted-out, the remaining two series are connected in parallel for opposite polarity excitation; and, between the short-out sequences, a first given series is excited in one polarity and the remaining two series are connected in series with each other and in parallel with the said first given series for opposite polarity excitation with respect to the said first given series.

A further feature of the invention resides in a novel arrangement providing a simple clip-brush structure whereby the brush contact elements may be readily removed for replacement and inspection.

Printed disc electrical motors and generators have heretofore been described, but the winding arrangement described herein represents a unique improvement over any known prior art structure. The novel single disc arrangement herein described is characterized by a winding pattern for the disc of the rotor assembly wherein the combined effect of every third spiral winding of the disc is tantamount in operation to an armature pole, in addition to the previously described nine armature pole centers embodied in the novel pattern of the disc itself.

Accordingly, it is an object of this invention to provide a disc type electrical machine having a printed circuit rotor of unique design such that improved operating characteristics are achieved in a single disc electrical device.

It is another object of this invention to provide a unique brush arrangement whereby the brush contact elements may be readily removed for replacement and inspection.

More specifically, it is an object of this invention to provide a single disc type electrical machine characterized by: high, lever torque; high speed; maximum efficiency; simple two-brush commutation such that frictional dissipations are minimized; maximum utilization of conductive patterns on the armature surface, minimum interconnections in the pattern of a single disc whereby fabrication and assembly costs are reduced; high horsepower per weight ratio in a light weight compact machine having no fly wheel effect and having excellent acceleration and deceleration characteristics; substantial uniformity of winding pattern arrangement whereby a minimum of vibration is evidenced in operation; self-cooling air draft features; and no-eddy current losses, sparking or insulation burn-outs in the uninsulated printed conductive pattern.

These and other objects, advantages and features of the subject invention will hereinafter appear, and, for purposes of illustration, but not of limitation, an embodiment of the invention is shown in the accompanying drawings, in which:

FIGURE 1 is a front elevational view of a direct current electric motor constructed in accordance with the teachings of this invention;

FIGURE 2 is a side elevational view of the motor of FIGURE 1;

FIGURE 3 is an enlarged sectional view taken along the line 3—3 of FIGURE 2, with the printed disc armature assembly being removed in order to show details of construction;

FIGURE 4 is a similar view taken along the line 4—4 of FIGURE 2, again with the printed disc armature assembly being removed in order to show details of construction;

FIGURE 5 is an enlarged sectional view taken along the line 5—5 of FIGURE 3;

FIGURE 6 is an enlarged exploded perspective view of the novel clip-and-brush arrangement shown in FIGURE 5;

Figure 7:
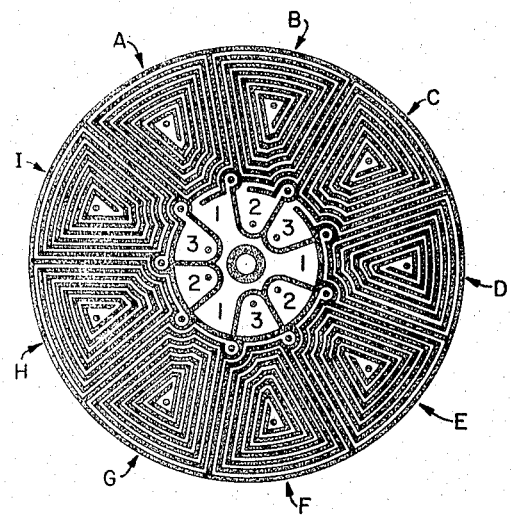
FIGURE 7 is an unfolded plan view showing the front surface of a single disc printed armature adapted for use in the motor structure shown in FIGURES 1-6.
Figure 8:
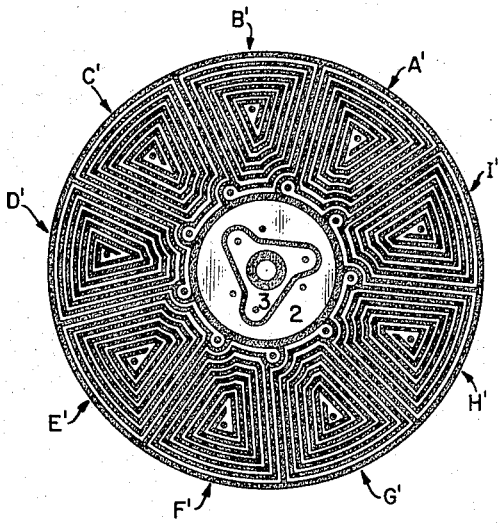
FIGURE 8 is a similar view of the rear side of the said disc.
Figure 9:
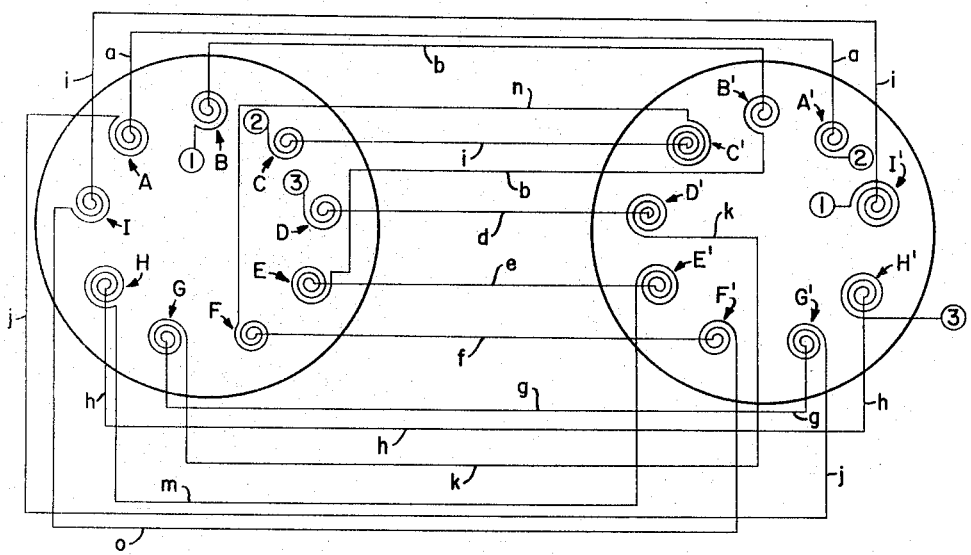

FIGURE 9 is a schematic circuit diagram of the combined interconnections between the disc surfaces shown in FIGURES 7 and 8, with the commutator sections being represented by the numerals 1, 2, and 3, corresponding to the numeral designations utilized in FIGURES 7 and 8.

With reference to the drawings, a direct current motor 10 is illustrated as exemplary of the teachings of this invention. The motor 10 comprises a housing 11 which supports a central shaft 12 rotatably journalled therein, as by bearings 14 and 16. The housing 11 comprises two symmetrical disc-shaped hull portions 11a and 11b, each of which is generally circular in outline and concavely hollow. A base 20 is defined by the offset abutment of the generally rectangular base portions 20a and 20b of the hull portions 11a and 11b, respectively. Each hull portion 11a and 11b is likewise provided with offset flange arms 22a, 22b, respectively, and 24a, 24b, respectively, which abut to define the flange connections 22 and 24, respectively. The offset abutment of the flange connections 22 and 24 and of the base portions 20a and 20b define a peripheral interstice 30 between the hull portions 11a and 11b, which interstice 30 serves as a self-cooling air draft exhaust for the motor 10, in a manner hereinafter described.

An aperture in flange connection 22 (defined by aligned apertures 26a and 26b of the flange arms 22a and 22b, respectively) receives a bolt-nut assembly 40; an aperture in flange connection 24 (defined by aligned apertures 28a and 28b of the flange arms 24a and 24b, respectively) receives a bolt-nut assembly 42; an aperture in the base 20 (defined by the aligned apertures 27a and 27b of the base portions 20a and 20b, respectively) receives a bolt-nut assembly 38; and an aperture in the base 20 (defined by the aligned apertures 29a and 29b of the base portions 20a and 20b, respectively) receives a bolt-nut assembly 36, whereby the hull portions 11a and 11b are mounted in spaced adjacency to define the peripheral interstice 30 by the simple four-point interconnection. Additional apertures 50 and 52 are provided in base portion 20b adjacent the apertures 27b and 29b thereof, respectively.

Terminals 54 and 56 are positioned on the base portion 20b, each said terminal having a generally oval outline with two spaced apertures (58, 60 and 62, 64, respectively) and an extending electrical contact finger (66 and 68, respectively). The apertures 58 and 60 of terminal 54 are aligned, respectively, with apertures 29b and 52 of base poriton 20b, and the apertures 62 and 64 of terminal 56 are aligned, respectively, with apertures 27b and 50 of base portion 20b.

An annulus 86b of ferromagnetic material is mounted on hull portion 11b, as by the self-tapping screw attachments 87b, 88b, and 89b into suitable bosses provided in the hull portion 11b (not shown). An equal number of preferably congruous arcuate magnets is mounted on the annulus 86b, such as the fixed magnets 92A, 92B, 92C, 92D, 92E, and 92F in the described embodiment (see FIGURE 3). These magnets are symmetrically positioned on the annulus 86b and are arranged such that each adjacent magnet is of opposite polarity with respect to its next adjacent neighbor. Thus, as shown in FIGURE 3, magnets 92A, 92C, and 92E will have north poles closest to the annulus 86b, whereas magnets 92B, 92D and 92F will have south poles closest to the annulus 86b. Obviously, the ferromagnetic annulus 86b serves as a magnetic flux path for the retained magnets. Similarly, an annulus 86a is mounted on the hull portion 11a, as by the corresponding screw attachments 87a, 88a and 89a, and correspondingly, magnets 94A, 94B, 94C, 94D, 94E and 94F are mounted on the annulus 86a in symmetrical positions of alternate polarity. Also, the magnets 94A–F are orientated such that the pattern of alternate polarity is staggered with respect to the magnets 92A–F (i.e., magnet 94D has a north pole closest to the annulus 86a, whereas the corresponding magnet 92D has a south pole closest to the annulus 86b), whereby a series of flux paths of alternating directions across the air gap 99 defined between the aligned magnets is obtained.

The particular choice of size and number of magnets and of magnetic material depends upon a variety of factors, with which a practitioner in the art is readily acquainted. Thus, the fixed stator magnets may be provided by conventional electromagnets or may be of the permanent magnet variety, such as, for example, a conventional alnico magnet. However, it is preferred to utilize a permanent type magnet formed of a sintered ferrite ceramic or a ferrite-rubber matrix, which is conventionally bonded to the annulus flux path. The ferrite-rubber matrix type magnets are specially desirable in that they contribute to the lightweight characteristics of the motor. Moreover, as described and explained in the aforementioned copending application, it has been found that unexcelled operating characteristics are achieved by providing magnets on both sides of the rotor assembly and by unbalancing the respective sides thereof. Thus, in a preferred embodiment, the magnets 92A–F on hull portion 11b, while each are of equal size relative to one another, are respectively larger (measured by the polar angle subtended by the arcuate magnets) than the corresponding magnets 9A–F. This asymmetrical disposition of arcuate magnets has been found to afford superior results as compared to either a balanced arrangement of magnets on both sides of the rotor or an unbalanced arrangement of magnets on one side with an armature return ring on the other.

The shaft 12, which as previously described is rotatably journalled in the bearings 14 and 16, carries a rotor assembly 300 which, in the described embodiment, comprises a single disc having a self-contained commutator pattern located thereon. Preferably, a conical bearing (not shown) is also located on the shaft 12 such that the rotor assembly 100 is positioned within the air gap 99 (defined between the facing magnet pairs 92A–F and 94A–F respectively) in alignment with the interstice 30; the commutator portion of the rotor assembly 300 bears against the brushes (hereinafter specified); and the said conical bearing bears against the bearing 14.

Any suitable material may be chosen for construction of the motor housing 11. A light weight, rigid plastic such as cast epoxy, nylon, or polyformaldehyde plastic has been found particularly suitable. Preferably, each hull portion 11a and 11b is provided with air duct openings, such as the openings 13 and 15 of hull portion 11b, as seen in FIGURES 1 and 3, and such as the openings 13' and 15' of hull portion 11b, as seen in FIGURE 4. When the rotor assembly 300 is in operation, as hereinafter described, a forced air draft will be maintained from the described air duct openings through the air gap 99 defined between the facing magnet pairs and out through the interstice 30, such that the motor will evidence self-cooling operational characteristics.

The novel brush arrangement is generally designated by the numeral 200 and is illustrated in FIGURES 3, 5 and 6. This arrangement comprises a left hand brush sub-assembly (shown in FIGURE 6) and a right hand brush sub-assembly (shown in FIGURE 5). Only one of the sub-assemblies will be described in detail, in view of the symmetry thereof, and like reference numerals utilized herein and in the drawings indicate like parts. Each brush sub-assembly comprises three major parts, namely, a leaf-spring leg 70, a brush-holding arm 72, and a base support 74. The leaf-spring leg 70 is generally L-shaped and is provided with a leg portion designated 76L for the left hand brush sub-assembly and 76R for the right hand brush sub-assembly. These leg portions are provided respectively with the apertures 78L and 78R, which apertures respectively receive the bolt assemblies 79L and 79R which connect respectively through the apertures 60 and 64 to the respective terminals 66 and 68. Each leaf-spring leg 70 is also provided with an aperture 80 by means of which the respective legs 70 are attached to the hull portion 11b, as by rivets (not shown), to the positions shown in FIGURE 3.

A centrally disposed rectangular shot 82 is provided in the stem portion of the leaf-spring leg 70, and a flange 84 extends perpendicularly from the said stem portion. An H-shaped arm 86 extends perpendicularly upwardly from the flange 84, and an angle-opening 87 is provided at the juncture of the H-shaped arm 86 and the flange 84.

The brush-holding arm 72 comprises a lower planar portion 88 which has a leg 90 extending perpendicularly therefrom. An arcuate central portion 92 interconnects the lower planar portion 88 with an upper planar portion 96. A central slot 94 is provided in the arcuate central portion 92. The upper planar portion 96 is provided with a central rectangular slot 98, and a brush element 100 is affixed to the upper extremity of the upper planar portion 96, above the central slot 98.

The base support 74 comprises a rectangular base 102 which is provided with a perpendicularly extending trapezoidal element 104. An extension tab 106 is provided on the extreme portion of the trapezoidal element 104 furthest away from the base 102. Perpendicular flanges 108 and 110 are mounted in the right angle defined between the juncture of the trapezoidal element 104 and the base 102 on either side of the extension tab 106. A rectangular block 112 is provided at the juncture between the trapezoidal element 104 and the base 102 on the opposite side relative to the disposition of the perpendicular flanges 108 and 110. An extension tab 114 is provided at an extreme end of the block 112, and the extension tab 114 is aligned with the extension tab 106 of the trapezoidal element 104.

When assembled, the leaf-spring leg 70 is affixed to the hull portion 11b, as previously described, and the base support 74 is likewise affixed to the hull portion 11b, as shown in FIGURES 3 and 5. The brush-holding arm 72 is positioned between and supported by the leaf-spring leg 70 and the base support 74 as follows:

The perpendicularly extending leg 90 of the brush-holding arm 72 is received in the angle-opening 87 of the leaf-spring 70, the extension tab 106 of the base 102 is received in the central slot 94 of the brush-holding arm 72, and the extension tab 114 of the rectangular block 112 (affixed to the base 102) is received in the slot 98 of the upper planar portion 96 of the brush-holding arm 72. In this manner, pressure exerted on the brush element 100 (for example, to the left in FIGURE 5, as by the contacting of the brush element 100 with the rotor assembly 300) causes the brush-holding arm 72 to pivot about the base support 74 as a fulcrum against the resiliency of the leaf-spring leg 70. In order to remove a given brush-holding arm, it is only necessary to pivot the brush-holding arm 72 (to the right, as shown in FIGURE 5) so as to withdraw the extension tabs 106 and 114 from the respective slots 94 and 98 and so as to withdraw the perpendicular extending leg 90 from the angle-opening 87, whereby the brush-holding arm 72 may be simply and expeditiously removed. In this manner, the brush element 100 is automatically adjusted in position against the rotor assembly 300 during operation, and the brush element 100, when required, may be readily removed by appropriate manipulation of the brush-holding arm 72.

The leaf-spring leg 70 and the brush-holding arm 72 are preferably formed of a conventional thin, flexible, conductive metal (such as copper or brass), and the brush elements 100 are preferably formed of a conventional brush material, such as a sintered copper-lead-graphite admixture. The base support 102 is formed of an insulating material, as for example the same plastic material of which the hull portion 11b is formed. In this manner, current introduced into the terminals 66 and 68 will be supplied through the screw assembly 79L and 79R to the brush elements 100, whereby current may be introduced to the rotor assembly 300.

The rotor assembly 300 comprises an insulating disc having a winding pattern of a conductive metal such as copper printed, plated, etched, or pressure-bonded thereon in a conventional manner. The insulating member is preferably a phenolic resin disc, a polyester sheet film, or a woven cloth fiberglass, such that the absence of magnetic material in the rotor assembly minimizes losses in the energy conversion process. Typically, the insulating disc is from 0.05 to 0.008 inch, and the winding pattern thereon has a thickness of from 0.004–0.007 inch. Apertures (as indicated by the circular dots in FIGURE 7 and FIGURE 8) are provided in the insulating disc. These apertures, which are about 0.03 inch in diameter, serve as conductive paths from one side of the disc to the other. Accordingly, they may be plated with the same conductive metal as is the winding pattern located on the respective surfaces of the disc, or separate conductive links such as metallic rivets may be inserted in the respective apertures.

The essential geometrical characteristic of the winding pattern is that it is located on the insulating disc between the center and the circumference thereof, so as to define nine magnetic pole centers, every third pole center being of the same polarity. The term "pole center" as utilized herein, is intended to define for purposes of illustration a convention whereby a given point may represent the net magnetic field of the immediately surrounding area, whether in an electromagnetically induced field (as in the rotor assembly itself) or in a permanent type magnetic field (as in the stator magnetic fields).

In the embodiment shown in FIGURES 7 and 8, the winding located on the insulating member traverses a plurality of convoluted paths, each defined by an outermost portion convoluting inwardly to an innermost portion, such that a pole center is defined within the confines of the convoluted path. Thus, as shown in FIGURE 7, nine such convoluted paths A, B, C, D, E, F, G, H, and I are illustrated, while FIGURE 8 illustrates the corresponding rear side of the insulating disc which comprises the convoluted paths A′, B′, C′, D′, E′, F′, G′, H′, and I′. The innermost extreme of each of the convoluted paths A-I is electrically connected to an aperture which connects with the innermost extreme of the corresponding one of the convoluted paths A′-I′ located on the opposite side of the disc. Thus, the innermost extreme of each convoluted path is electrically connected to the corresponding innermost extreme of the convoluted path located on the opposite side of the disc.

Also, the innermost extreme of a given convoluted path on one side of the disc is electrically connected to the outermost extreme of the third adjacent spiral provided on the same side of the disc. In the described embodiment, this interconnection is accomplished via the convoluted path provided on the opposite side of the disc corresponding to the first said convoluted path. For example, the innermost extreme of the convoluted path B is electrically connected to the innermost extreme of the convoluted path B′ (located on the opposite side of the disc), and the outermost extreme of the convoluted path B′ is connected to an aperture provided intermediate the convoluted paths C′–D′ (and of course C–D), such that the outermost extreme of the convoluted path B′ is connected to the outermost extreme of the convoluted path E located on the opposite side of the disc.

A commutator pattern is provided on either side of the insulating disc for appropriate interconnection with the windings comprising the previously designated convoluted paths. In the described embodiment, the commutator pattern comprises three mutually insulated conductive regions 1, 2 and 3. These regions are defined by the division of one side of the insulating member into nine generally arcuate or wedge-shaped segments, three of which comprising region 1 are mutually interconnected around the center of one side of the insulating disc; three of which comprising region 3 are mutually interconnected by a generally clover-leaf portion provided on the opposite side of the insulating disc; and the remaining three of which comprising region 2 are mutually interconnected by a generally annular belt provided on the same side of the insulating disc as the generally clover-leaf portion. Suitable apertures are provided to define electrical interconnections from one side of the disc to the other, as indicated in FIGURES 7 and 8.

FIGURE 9 illustrates schematically the circuit arrangement provided by the combination of the convoluted path windings with the commutator pattern shown in FIGURES 7 and 8. In FIGURE 9 the reference numerals 1, 2 and 3 correspond to the mutually interconnected regions 1, 2 and 3 of the commutator pattern, as shown in FIGURES 7 and 8. Three adjacent convoluted paths on one side of the insulating disc are connected respectively to the three conductive regions of the commutator pattern. For example, the outermost extreme of the convoluted path B is connected to the region 1; the outermost extreme of the convoluted path C is connected to the region 2; and the outermost extreme of the convoluted path D is connected to the region 3. Similar commutator-winding interconnections are provided on the opposite side of the disc to three other convoluted paths. As shown in FIGURE 9, the outermost extreme of the convoluted path A' is connected to the conductive region 2; the outermost extreme of the convoluted path I' is connected to the conductive region 1; and the outermost extreme of the convoluted path H' is connected to the conductive region 3.

Thus, FIGURE 9 schematically illustrates the total interconnections provided in the winding pattern itself and in the commutator pattern as related to the winding pattern in the following manner:

Leads $a, b, c, d, e, f, g, h, k$ and $i$ respectively interconnect the innermost extremes of a convoluted path A–I with the corresponding innermost extremes of a convoluted path A'–I'. A lead $j$ interconnects the outermost extreme of the convoluted path A with the outermost extreme of the convoluted path G'; a lead $k$ connects the outermost extreme of the convoluted path G with the outermost extreme of the convoluted path D'; a lead $l$ interconnects the outermost extreme of the convoluted path E with the outermost extreme of the convoluted path B'; a lead $m$ interconnects the outermost extreme of the convoluted path H with the outermost extreme of the convoluted path E'; a lead $n$ interconnects the outermost extreme of the convoluted path F with the outermost extreme of the convoluted path C'; and a lead $o$ interconnects the outermost extreme of the convoluted path I with the outermost extreme of the convoluted path F'. Likewise, as previously indicated, the outermost extreme of the convoluted path B is connected to the outermost extreme of the convoluted path I' via the conductive region 1 of the commutator; the outermost extreme of the convoluted path C is connected to the outermost extreme of the convoluted path A' via the conductive region 2 of the commutator; and the outermost extreme of the conductive path D is connected to the outermost extreme of the connected path H' via the conductive region 3 of the commutator pattern.

In operation, an insulating disc provided with the winding and commutator patterns shown in FIGURES 7 and 8 is mounted on a shaft 12 to provide a rotor assembly 300 for a motor 10, such as is shown in FIGURES 1–6. The brush elements 100 of the left hand and the right hand brush sub-assemblies will bear against the commutator pattern of the insulating disc at a 180 degree relative disposition, and the six stator pole centers defined by the aligned magnets 92A–92F and the corresponding magnets 94A–94F will cooperate with induced pole centers in the winding patterns shown in FIGURES 7 and 8 (which pole centers are induced by a potential across the brush elements 100) so as to provide a given induced rotation of the shaft 12. The motor will in all events be instantaneously self-starting and will continuously run so long as a given potential is impressed across two brush elements 100.

To appreciate the functioning of the apparatus, the following assumptions may be made:

Assume that the radial lines separating the segments comprising the regions 1, 2 and 3 of the commutator pattern are infinitesimally narrow and that the brush elements 100 are likewise infinitesimally narrow and that the brush elements 100 are likewise of an infinitesimal width just slightly in excess of the width of the said radial lines. Assume that a rotor assembly is placed adjacent the brushes 100 such that a radial line separating two adjacent regions 2 and 3 is beneath a left hand brush element 100. Obviously, this relationship means that the center of a region 1 180° away will be beneath the right hand brush element 100. Assume further that the insulating disc is aligned with a set of six stator magnets (such as the magnets 92A–92F in FIGURE 3) such that the respective pole centers of each of the convoluted paths A, D, and G are directly aligned with the respective pole centers of the magnets 92A, 92E and 92C. Assume a positive current flow from the right hand brush element 100 to the left hand brush element 100 and assume the following arbitrary right-hand rule for electromagnetic conduction:

When positive current flows in a planar convolution, the thumb of the right hand will point to the induced north pole when the index finger of the same hand is perpendicular to the thumb and is pointing in the direction of positive current flow.

Based upon the foregoing assumptions, the following instantaneous phenomena will be evidenced: the convoluted paths A, D, and G will be shorted out; the convoluted paths B, E, and H will be energized in one given polarity by positive current flow from the region 1 (contacting the right hand brush element 100) through the convoluted paths B, E, and H to the conductive region 3 (contacting the left hand brush element 100); and the convoluted paths C, F, and I will be energized in an opposite polarity, as positive current may be traced from the right hand brush element 100 through the conductive region 1, through the respective convoluted paths I', F' and C' to the conductive region 2, and thence to the left hand brush element 100.

This state of events will cause the disalignment of the respective pole centers of the rotor assembly 300 and of the stator field magnets to induce rotation of the rotor assembly 300 (and thereby of the commutator pattern relative to the 180° spaced brush elements 100).

After the rotor assembly has rotated clockwise by an infinitesimal angle, the left hand brush element 100 will be within region 2 and the right hand brush element 100 will still remain in the region 1. Under these conditions, the series of convoluted paths B, E, and H will be energized in the same direction as that previously described, but at half the potential previously described, since the series of convoluted paths A, D, and G will now be energized in the same polarity by virtue of their series connection with the series of coils B, E, and H. At the same time, the series of convoluted paths C, F, and I will be energized exactly opposite to the respective series of convoluted paths B, E, and H and A, D, and G. In other words, the B, E, H and the A, D, and G series will be in series with each other and in parallel with the C, F, and I series. Under these conditions, the rotor assembly 300 will again be induced to rotate in the same direction as previously described.

It will be apparent to one skilled in the art that the foregoing analysis may be continued for a full 360 degrees of revolution and that revolution of the rotor assembly 300 in a given direction will be continuously induced. In fact, Table I presents the instantaneous data reported by such a continuing analysis for 120 degrees of rotation. In the table, the symbol S indicates that a given series of three convoluted paths is shorted out; the symbol F indicates that a given series of three convoluted paths is energized by the full potential across the brush elements 100; the symbol H indicates that a given series of three convoluted paths is energized by one-half of that potential; the symbol + indicates that energization is in one given direction; and the symbol — indicates that the energization is opposite of the said given direction.

Accordingly, in general terms, it will be realized:
(1) that a first series of three convoluted paths experiences:
   (a) an instantaneous short-out when the pole centers thereof align with the pole centers of three stator magnets;
   (b) energization in one direction for 60 degrees of rotation thereafter;
   (c) another instantaneous short-out as the pole centers again align with three respective pole centers of the stator magnets; and
   (d) energization in a reverse direction for the next 60 degrees of rotation in the same continued direction;
(2) that a second series of three convoluted paths experiences the exact same sequence of energization in one direction for 60 degrees, short-out, and energization in reverse direction for another 60 degrees, but in a 20 degree phased relationship with the first said series of three convoluted paths; and
(3) that the third series of convoluted paths similarly experiences the exact same energization, short-out, energization sequence, but in a 40 degree phased relationship with the first said series of three convoluted paths.

Stated alternatively, two series of three convoluted paths each will tend to cause rotation while a third series of three convoluted paths is instantaneously shorted out, each one of the three series of convoluted paths instantaneously shorting out and reversing polarities in sequence at every 20 degrees of angular rotation; and all three series of three convoluted paths each, two of the said series being in series-parallel connection with the third, will tend to cause the same induced rotation in the interval between each 20 degree phased short-out. In effect, the described motor operates as if each separate series of three convoluted paths each were an armature pole, notwithstanding the disposition of nine armature poles on each disc corresponding to the six (or two-thirds of nine) stator magnetic poles utilized.

Obviously, the assumption utilized to describe the operation of the motor are not in consonance with reality (namely, that the radial lines separating the commutator segments comprising the regions 1, 2, and 3 are infinitesimally narrow and that the brushes 82 and 84 are likewise of infinitesimal width just slightly in excess of the width of the said radial lines). In any actual embodiment, the indicated radial lines will have a finite width and of course the brushes will have a finite area. This attribute of actual physical embodiments produces a slightly different operation since a brush continues to overlap two adjacent regions for a period longer than the aforementioned infinitesimal angle of rotation. However, it will be apparent to one skilled in the art that a corresponding analysis of the motor operation may be effected, taking these factors into consideration, and that the motor will operate in a self-starting and continuous fashion, dependent upon the polarity of the potential induced across the brush elements 100. For further details of the theoretical phased relationships of the various winding patterns, reference is had to the aforementioned copending application, in which an analagous presentation is set forth for multiple disc motor operations.

A practitioner in the art, in view of the teachings herein, will be able to provide numerous practical embodiments of the invention by suitable variations in brush size and position, stator magnet number and location, rotor disc pattern, position of rotor disc connecting apertures relative to the rotor disc pattern, and commutator pattern and relative location.

It should be understood that various changes and modifications of the invention may be made in the details of construction, arrangements, operations, and materials for the various elements, without departing from the spirit and the scope of the invention, especially as defined in the appended claims.

TABLE I.—INFINITESIMAL BRUSH POINT CONTACT SINCE DISC COMPOSITE CONVOLUTED WINDING AND COMMUTATOR MOTOR.

| Angular Rotation in Degrees | Region of Commutator Contacted by Brush | | Convoluted Paths | | |
|---|---|---|---|---|---|
| | Left (−) | Right (+) | B, E, H | C, F, I | A, D, G |
| 0 | 2–3 | 1 | F+ | F− | S |
| | 2 | 1 | H+ | F− | H+ |
| 20 | 2 | 1–3 | S | F− | F+ |
| | 2 | 3 | H− | H− | F+ |
| 40 | 2–1 | 3 | F− | S | F+ |
| | 1 | 3 | F− | H+ | H+ |
| 60 | 1 | 2–3 | F− | F+ | S |
| | 1 | 2 | H− | F+ | H− |
| 80 | 1–3 | 2 | S | F+ | F− |
| | 3 | 2 | H+ | H+ | F− |
| 100 | 3 | 2–1 | F+ | S | F− |
| | 3 | 1 | F+ | H− | H− |
| 120 | 3–2 | 1 | F+ | F− | S |

What is claimed is:

1. A conductive rotor assembly for an electro-mechanical energy converter comprising:
   an insulating member having a circular cross-section and having a first conductive winding pattern and a second conductive commutator pattern thereon,
   said first pattern comprising a conductive winding located between the center and the circumference of the insulating member to define nine pole centers on one surface of the said member,
   each pole center having the same polarity as the third pole center adjacent thereto,
   each one of said nine pole centers being spaced from its next adjacent pole center neighbor at 40°, and
   said second pattern comprising nine circular wedge segments, each adjacent segment being mutually insulated, each third segment being electrically connected, and each of the said segments being symmetrically positioned at 40°; and
   means electrically connecting said first and said second patterns.

2. A conductive rotor assembly as claimed in claim 1 wherein the said means electrically connecting said first and said second pattern provides an electrical connection between one of the nine pole centers of the first pattern with one of the nine segments of the second pattern; between a second of the nine pole centers of the first pattern with a second of the nine segments of the second pattern; and between a third of the nine pole centers of the first pattern with a third of the nine segments of the second pattern.

3. A rotor assembly for use in an electro-mechanical energy converter comprising:
   an insulating member having a centrally located aperture for fixedly mounting the member on a rotatable shaft and having a first conductive winding pattern and a second conductive commutator pattern located thereon,
   the said conductive winding pattern comprising a conductive winding located on the surface of the insulating member between the center and the circumference thereof so as to define nine pole centers, each pole center having the same polarity as the third pole center adjacent thereto,
   the said conductive winding traversing nine convoluted paths, each defined by an outermost portion convoluted inwardly toward an innermost portion, such that a pole center is defined within the confines of each convoluted path,
   the said convoluted paths being positioned in adjacent non-overlapping sectors of the insulating member and each comprising a continuous spiral, the direction of the spiral in each conductive path being identical, the said commutator pattern comprising nine circular wedge segments, each adjacent segment being mutually insulated, each third segment being electrically connected, and each of the said segments being symmetrically positioned at 40°, and means electrically connecting said first and said second patterns.

4. A rotor assembly as claimed in claim 3 wherein the said means electrically connecting said first and said second patterns comprises conductive interconnections such that each spiral of the conductive pattern is connected in series with the third spiral adjacent thereto by connecting the innermost extreme of a given spiral to the outermost extreme of a third adjacent spiral so as to define three series units of three spirals each, and such that a first said series of three spirals is electrically connected across a first and a second commutator segments, a second said series of three spirals is electrically connected across the second and a third commutator segments, and the third said series of three spirals is electrically connected across the first and the third commutator segments.

5. A conductive rotor for an electro-mechanical energy converter comprising:
    an insulating member having a centrally located aperture for fixedly mounting the member on a rotatable shaft and having a conductive winding pattern located thereon, the said pattern comprising a conductive winding located on the surface of the insulating member between the center and the circumference thereof so as to define nine pole centers, every third of the said nine pole centers having the same polarity,
    the said conductive windings traversing nine convoluted paths, each defined by an outermost portion convoluting inwardly to an innermost portion, such that a pole center is defined within the confines of each convoluted path,
    the said convoluted paths being located in adjacent non-overlapping sectors of the insulating member and each comprising a continuous spiral, the direction of the spiral in each conductive path being identical, and
    conductive means connecting each spiral in series with the third spiral adjacent thereto by connecting the innermost extreme of a given spiral to the outermost extreme of a third adjacent spiral.

6. An electro-mechanical energy converter comprising:
    a housing;
    a shaft rotatably journalled within the housing;
    means provided flux paths annularly disposed with respect to the shaft, said paths comprising six magnetic pole centers, each pole center being of opposite polarity with respect to its next adjacent pole center neighbor;
    a rotor assembly adapted for rotation with the shaft and comprising:
    an insulating member having a circular cross-section and having a first conductive winding pattern and and a second conductive commutator pattern thereon,
    said first pattern comprising a conductive winding located between the center and the circumference of the insulating member to define nine pole centers on one surface of the said member,
    each said pole center being of the same polarity as the third pole center adjacent thereto and being spaced from its next adjacent pole center at 40°, and
    said second pattern comprising nine circular wedge segments, each adjacent segment being mutually insulated, each third segment being electrically connected, and each of the said segments being symmetrically positioned at 40°; and
    brush means adapted to bear against the commutator pattern located on the insulating member.

7. An electro-mechanical energy converter comprising:
    a housing;
    a shaft rotatably journalled within the housing;
    means provided flux paths annularly disposed with respect to the shaft, said paths comprising six magnetic pole centers, each pole center being of opposite polarity with respect to its next adjacent pole center neighbor;
    a rotor assembly adapted for rotation with the shaft and comprising:
    an insulating member having a centrally located aperture for fixedly mounting the member on the rotatable shaft and having a first conductive winding pattern and a second conductive commutator pattern located thereon,
    the said conductive winding pattern comprising a conductive winding located on the surface of the insulating member between the center and the circumference thereof so as to define nine pole centers, each pole center having the same polarity as the pole center third adjacent thereto,
    the said conductive winding traversing nine convoluted paths, each defined by an outermost portion convoluting inwardly toward an innermost portion, such that a pole center is defined within the confines of each convoluted path,
    the said convoluted paths being positioned in adjacent non-overlapping sectors of the insulating member and each comprising a continuous spiral, the direction of the spiral in each conductive path being identical, and
    the said commutator pattern comprising nine circular wedge segments, each adjacent segment being mutually insulated, each third segment being electrically connected, and each of the said segments being symmetrically positioned at 40°; and
    brush means adapted to bear against the commutator pattern located on the insulating member.

8. An electro-mechanical energy converter as claimed in claim 7 wherein the said means electrically connecting said first and second patterns comprises conductive interconnections such that each spiral of the conductive pattern is connected in series with the third spiral adjacent thereto by connecting the innermost extreme of a given spiral to the outermost extreme of a third adjacent spiral so as to define three series units of three spirals each, and such that a first said series of three spirals is electrically connected across a first and a second commutator segments, a second said series of three spirals is electrically connected across the second and a third commutator segments, and the third said series of three spirals is electrically connected across the first and the third commutator segments.

9. An electro-mechanical energy converter as claimed in claim 7 wherein the said brush means comprises:
    an insulating base support adapted for fixed position seating in the said housing;
    a conductive leaf-spring member adapted for fixed position seating in the said housing;
    a conductive brush-holding member;
    means for pivotally and releasably supporting said brusholding member between the said insulating base support and the said leaf-spring member; and
    an electrical contact brush element carried by the said brush-holding member and adapted to bear against the commutator pattern located on the insulating member.

10. An electro-mechanical energy converter as set forth in claim 6 and further comprising:
    a brush assembly for said electro-mechanical energy converter, said assembly including
    an insulating base support adapted for fixed position seating in the said converter;

a conductive leaf-spring member adapted for fixed position seating in the said converter;
a conductive brush-holding member; and
means for pivotally and releasably supporting said brush-holding member between the said insulating base support and the said leaf-spring member; and wherein said brush means comprises
electrical contact means carried by the said brush-holding member.

11. An electro-mechanical energy converter as set forth in claim 6 and further comprising:
a brush assembly for use in said electro-mechanical energy converter said assembly including
an insulating base support affixed to the said converter;
tab means extending from the said insulating base support;
a conductive leaf-spring, one end of which is affixed to the said converter;
slot means provided in the said leaf-spring;
a brush-holding member provided with tab means for interlocking with the slot means of the leaf-spring and with slot means for interlocking with the tab means of said insulating base support; and wherein said brush means comprises
an electrical contact brush carried by the said brush-holding member,
said brush-holding member being releasably secured between the said insulating base support and the said leaf-spring.

12. An electro-mechanical energy converter as set forth in claim 6 and further comprising:
a brush assembly adapted for use in said electro-mechanical energy converter and including:
an insulating base support affixed to the said converter;
a conductive leaf-spring, one end of which is affixed to the said converter and the other end of which is free to pivot relative to the said converter;
female slot means provided in the said leaf-spring;
male tab means provided in the said insulating base support,
the said slot and tab means being adapted to releasably interlock;
a brush-holding member provided with an opening such that the said tab means may pass therethrough in order to releasably secure the said brush-holding member between the said insulating base support and the said leaf-spring; and wherein said brush means comprises
an electrical contact brush member affixed to and carried by the said brush-holding member,
said brush-holding member being releasably and pivotally secured between the said insulating base support and the said leaf-spring.

13. A conductive rotor assembly as set forth in claim 1 wherein the said segments are in three equal sets, each set comprising every third segment, the segment of one set being electrically interconnected around the center of the insulating member on one side thereof, the segment of another set being electrically interconnected around the circumference of the insulated member on the same side thereof, and the segments of the remaining set being interconnected by a conductive path on the other side of the insulating member.

14. A conductive rotor assembly as set forth in claim 1 wherein the said segments are in three equal sets, each set comprising every third segment, the segments of one set being electrically interconnected around the center of the insulating member on one side thereof, the segments of the other two sets being separately interconnected by distinct conductive paths on the other side of the insulating member.

15. A conductive rotor assembly for an electro-mechanical energy converter comprising:
an insulating member having a circular cross-section and having a first conductive winding pattern and a second conductive commutator pattern thereon,
said first pattern comprising a conductive winding located between the center and the circumference of the insulating member to define $3/2n$ pole centers on one surface of the said member, where $n$ is an even number greater than 2,
each pole center of said rotor having the same polarity as the third pole center adjacent thereto,
each one of said pole centers being spaced from its next adjacent pole center neighbor at $$2/3\left(\frac{360}{n}\right)^0$$

and
said second pattern comprising $3/2n$ circular wedge segments, each adjacent segment being mutually insulated, each third adjacent segment being electrically connected, and each of the said segments being symmetrically positioned at $$2/3\left(\frac{360}{n}\right)^0$$

and
means electrically connecting said first and said second patterns.

16. An armature device for use in an electromechanical energy converter, said device having $n$ even poles in its stator, where $n$ is greater than 2, and comprising:
an insulating member having a centrally located aperture for fixedly mounting the member on a rotatable shaft and having a first conductive winding pattern and a second conductive commutator pattern located thereon,
said first conductive winding pattern comprising a conductive winding located on the surface of the insulating member between the center and the circumference thereof so as to define $3/2n$ pole centers where $n$ is an even number greater than 2 and represents the number of pole centers in said stator used with said rotor assembly, each pole center of said rotor having the same polarity as the third pole center adjacent thereto,
said first conductive winding traversing $3n/2$ convoluted paths, each defined by an outermost portion convoluted inwardly toward an innermost portion, such that a pole center is defined within the confines of each convoluted path,
said convoluted paths being positioned in adjacent non-overlapping sectors of the insulating member and each comprising a continuous convolute, the direction of the convolute in each conductive path being the same,
said conductive commutator pattern comprising $3n/2$ circular wedge segments each adjacent segment being mutually insulated, each third adjacent segment being electrically connected, and each of the said segments being symmetrically positioned at $$2/3\left(\frac{360}{n}\right)^0$$

and
means electrically connecting said first and said second patterns.

(References on following page)

References Cited by the Examiner

UNITED STATES PATENTS

| | | | |
|---|---|---|---|
| Re. 25,305 | 12/1962 | Haydon | 310—268 |
| 2,853,637 | 9/1958 | Ishihawa | 310—268 |
| 3,026,433 | 3/1962 | Mueller | 310—239 |
| 3,054,011 | 11/1962 | Silverscholtz et al. | 310—268 |
| 3,143,677 | 8/1964 | Heiler | 310—239 |

OTHER REFERENCES

Technical Data Publication, Bill Haydon, TWX WBY 121, Catalogue 62–1.

MILTON O. HIRSHFIELD, *Primary Examiner.*

ORIS L. RADER, *Examiner.*

J. J. SWARTZ, *Assistant Examiner.*

UNITED STATES PATENT OFFICE
CERTIFICATE OF CORRECTION

Patent No. 3,308,322                                March 7, 1967

James H. Hahn

It is certified that error appears in the above identified patent and that said Letters Patent are hereby corrected as shown below:

Column 2, line 14, "lever" should read -- level --. Column 3, line 39, "poriton" should read -- portion --. Column 4, line 16, "9A-F" should read -- 94A-F --. Column 5, line 50, "perpendicular" should read -- perpendicularly --. Column 12, line 41, after "and" insert -- said --.

Signed and sealed this 12th day of August 1969.

(SEAL)
Attest:

Edward M. Fletcher, Jr.                          WILLIAM E. SCHUYLER, JR.

Attesting Officer                                        Commissioner of Patents